Aug. 4, 1964 R. W. LANDAUER 3,143,657

PARAMETRONS

Filed Dec. 23, 1959 2 Sheets-Sheet 1

INVENTOR
ROLF W. LANDAUER

BY John A. Hall

ATTORNEY

FIG. 8
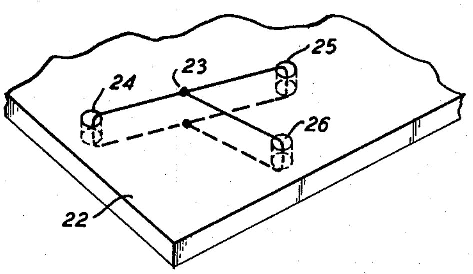
FIG. 9
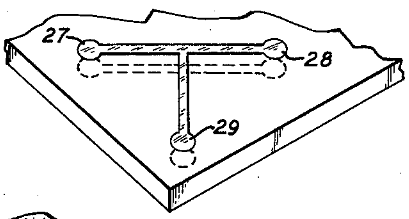
FIG. 10
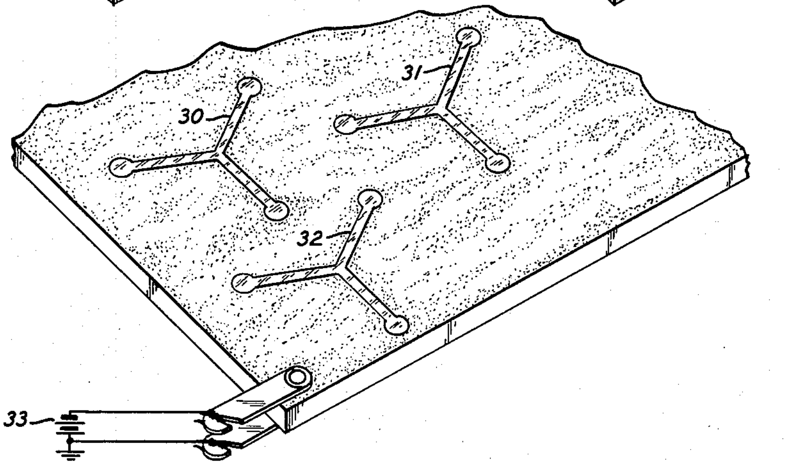
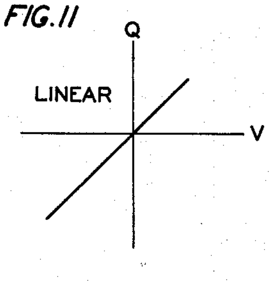
FIG. 12
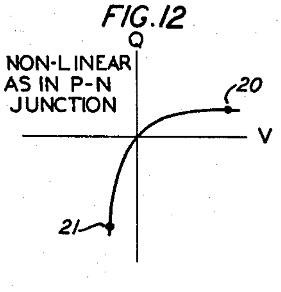
FIG. 13
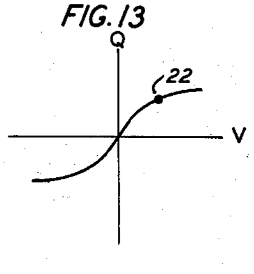
FIG. 14
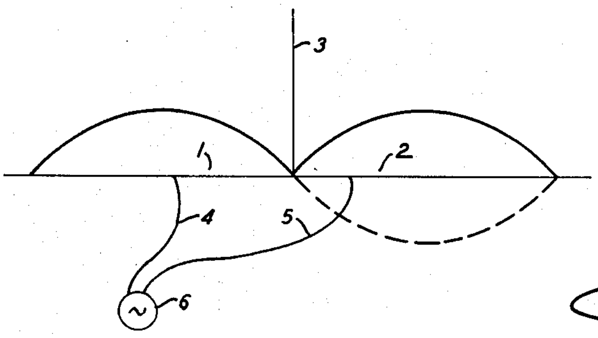
INVENTOR
ROLF W. LANDAUER
BY [signature]
ATTORNEY

United States Patent Office 3,143,657

Patented Aug. 4, 1964

3,143,657

PARAMETRONS

Rolf William Landauer, Poughkeepsie, N.Y., assignor to International Business Machines Corporation, New York, N.Y., a corporation of New York Filed Dec. 23, 1959, Ser. No. 861,595
12 Claims. (Cl. 307—88)

This invention relates to electronic circuit components, and particularly to devices intended to operate in the field of superhigh frequencies, otherwise known as the centimeter range, or where the circuit components have physical dimensions commensurate with the wavelength of the currents they will handle.

The object of the invention is to provide a circuit component which by its physical dimensions and its environment will possess electrical properties suitable for use in the field of superhigh frequencies and useful as components for devices, such as high speed digital computers. It is particularly an object of the invention to provide an improved design of an element which utilizes parametric oscillation and sometimes known as a parametron, an appellation now believed to have general significance.

As an aid to understanding the construction and use of such a device, reference is made to the following examples of the prior art.

(1) Patent 2,815,488, John von Neumann.

(2) An article entitled "A New Concept in Computing," by R. L. Wigington, published in the Proceedings of the Institute of Radio Engineers for April 1959, pages 516–523.

(3) An article entitled "The Parametron, a Digital Computing Element Which Utilizes Parametric Oscillation," by Eiichi Goto, published in the Proceedings of the Institute of Radio Engineers for August 1959, pages 1304 to 1316.

(4) An article entitled "Low Noise in Solid State Parametric Amplifiers at Microwave Frequencies," by W. E. Danielson, published in the Journal of Applied Physics, vol. 30, No. 1, pages 8–15, January 1959.

It will appear from the above that a parametron is essentially a resonant circuit having a reactive element varying periodically at a frequency $2f$ which generates a parametric oscillation at the subharmonic frequency $f$, and that since such a device is bistable it may be used to express, store, and transmit binary information. A parametron may then be otherwise defined as a circuit element based on the use of a variable parameter reactor.

In accordance with the present invention, a device is provided in which the resonant frequency of its operation is controlled by its environment, the nature of the material from which it is constructed and the dimensions thereof. In a preferred embodiment of the invention, the device is constructed of ferroelectric material used as a thin wafer of dielectric and having conducting material strips secured to the opposite sides thereof so as to form a circuit element characterized by an appreciable measure of capacitance. The particular ferroelectric material employed is chosen for its nonlinear properties or, alternatively, it is subjected to an environment where it will exhibit pronounced nonlinear properties, preferably without hysteresis, as by temperature control, or by direct current biasing. In this preferred embodiment, the condenser element is made in the form of a transmission line of one half of the wave length of the parametric oscillation developed therein so that the reaction to a potential of double the frequency applied thereto will be the creation of a standing wave. To the center point of this section of transmission line a quarter wave length stub is attached which will have the effect of dividing the length of the device so that the frequency of $2f$ applied to each half thereof will set up resonance in that half at frequency $2f$ to supply the increments of energy at frequency $f$ needed to develop the parametric oscillation.

The basic consideration in such a device is to provide means to decouple the two stubs to each of which the stimulus is applied whereby increasing or decreasing capacitance caused by the nonlinear reaction to the changing value of the stimulus will apply to the conducting elements of the device all along the line. It will be realized that a half wave length of transmission line proportioned to respond to a frequency $f$ will be a full wave length for a frequency $2f$, which pictured by a sinusoid will include two equal and opposite parts, that is, a positive half and a negative half. The said stub attached midway of the length of the element therefore constitutes means to permit the sign of the increasing or the decreasing potential from a source of frequency of $2f$ applied to the two halves of the device to be simultaneously changing in the same sense all along the length thereof.

Expressed in another manner, the midpoint stub equal to one half the wave length of the stimulus or one quarter the wave length of the parametric oscillation produced, constitutes a means to permit the two stubs, which together act as a half wave length device for the parametric oscillation, to respond in concert and in like manner to the same stimulus whereby the sinusoidal increasing and decreasing values of a half wave length of the stimulus is imparted to the parametric oscillation half wave length device. Thus, the longer half wave length device is made to respond to the shorter wave length stimulus. It may be helpful in this explanation to liken the half wave length device made of these two stubs to the seesaw, one end of which always moves in opposition to the other end. Thus, if equal weights are simultaneously applied to the two ends, no result would be obtained. Likewise, herein, in the absence of this decoupling stub, the same stimulus applied to both halves of the device would produce no result. However, if the seesaw were hinged in the middle, then both ends would simultaneously fall or both ends might be simultaneously lifted upwardly. Thus, the midpoint stub permits the two stubs constituting a half wave length for the signal frequency $f$ to act in concert. It will be seen, therefore, that the stimulus at frequency $2f$ continuously changes the reactance all along the half wave length line in the same phase, that is, the reactance is either being increased all along the line or decreased all along the line at the same time. As a result, there is a continuous interchange of energy between the stimulus at frequency $2f$ and the signal at the frequency $f$ which is built up in the line.

When it is said that the stub connected to the centerpoint of a half wave length of transmission line decouples the two halves thereof, it means that each half will have to be separately connected to the stimulus and hence a straight or a reversed connection may be made and each said half will respond in accordance with the nature of such connection to the stimulus.

Through the use of ferroelectric material having nonlinear properties, or in which nonlinear properties may be developed by a controlled environment, or by biasing means, the capacitance thereof will rise during the period when the potential applied thereto is changing in one direction and will fall during the periods when the potential applied thereto is changing in the other direction. Thus, the succeeding contributions of energy from the stimulus at frequency $2f$ to the line cause a subharmonic signal at frequency $f$ to be built up in the line to a maximum value determined by the circuit characteristics and to be maintained at this value.

The device of the present invention may be constructed and arranged in a variety of forms, such as the simple combination of three stubs each a half wave length of the stimulus in length or it may be embodied in more general circuitry such, by way of example, as a transmission line circuit resonant to both frequencies $f$ and $2f$ and having a one quarter frequency $f$ wave length stub at every node of the stimulus. Again, the stubs may be increased in length by an arbitrary half wave length of the lower frequency $f$.

Where the device of the present invention takes the form of a plurality of stubs or sections of transmission line each a quarter wave length of the parametric oscillation to be developed, commonly having their open ends connected together and their distant ends closed (physically or by nodal response), any two of such stubs will constitute a half wave length transmisison line. Therefore, if a source of potential of a frequency $2f$ is connected to the conductors of these stubs, each of which is one half the wave length of the driving (or pumping) potential, then through such nonlinear characteristics of the basic ferroelectric material, the effect will be to produce an exponentially increasing half wave of parametric oscillation during this application of driving potential.

A feature of the invention is the combination of a plurality of closed end transmission lines having their open ends each connected in parallel to the open ends of the others, a pair of output conductors connected to said junction leading to points of use including the input circuits of like devices and a pair of input conductors connected to the conductors of each of two of said transmission lines leading to a source of input potential of a frequency equal to $2f$ wherein the frequency $f$ is represented by the said combination of two of said transmission line sections. The transmission line section which is not interconnected with the said source of driving or pumping potential serves the purpose of dividing the said combination constituting a one half wave length (of the parametric oscillation) transmisison line into two quarter wave length lines or two such lines each a half wave length of the driving or pumping frequency. Thus, the said stub provides a means to permit two halves of the half wave device to act in concert, since when they are decoupled the stimulus connected into one may be reversed into the other or they may both be connected alike. It is to be emphasized that nothing changes the value or the sign of the stimulus in respect to time so that the said stub constitutes a means to adjust the relative phase of the two halves of the transmission line, that is, of the two stubs which in combination constitute the transmisison line.

A feature of the invetnion is the use of a strikingly nonlinear material to form, with conducting material laid thereon and having dimensions commensurate with the wave length of oscillations handled thereby, a device subject to development therein of parametric oscillations.

Another feature of the invention is a device which will respond to a stimulus of double its frequency to build up a parametric oscillation, the input to which may come from the output from a similar device.

Other features will appear hereinafter.

The drawings consist of two sheets having fourteen figures, as follows:

FIG. 8 is a perspective view showing a device of the present invention which may be constructed by conductors laid on and threaded through a thin slab of ferroelectric material;

FIG. 9 is a similar perspective view showing how a device of the present invention may be constructed by fixing to the top and bottom surfaces of a thin slab of ferroelectric material by evaporation, spraying, painting, or otherwise laying conducting material in such a form that the terminals thereof are enlarged to provide a condenser effect so as to close the ends of the transmission line stubs;

FIG. 10 is a similar perspective view showing how a plurality of devices of the present invention may be formed on a single slab of ferroelectric material and how the material may be biased to confine its working to a region of marked nonlinearity by covering the slab of ferroelectric material and the devices with a thin coating of conducting material having an appreciable resistance value;

FIG. 11 is a graph showing the relationship between charge and voltage in a capacitor where the dielectric has a strictly linear response;

FIG. 12 is a graph showing the relationship between charge and voltage in a capacitor where the dielectric has a nonlinear response such as that exhibited by a p-n junction;

FIG. 13 is a graph showing the characteristic hysteresis curve of certain ferroelectric material and indicating how, by direct current biasing, such material may be worked at a point where the nonlinear response thereof is marked; and FIG. 14 is a diagram intended to help in the explanation of the function of the decoupling stub.

Figures 1, 2, 3, 4, 5, 6, 7:
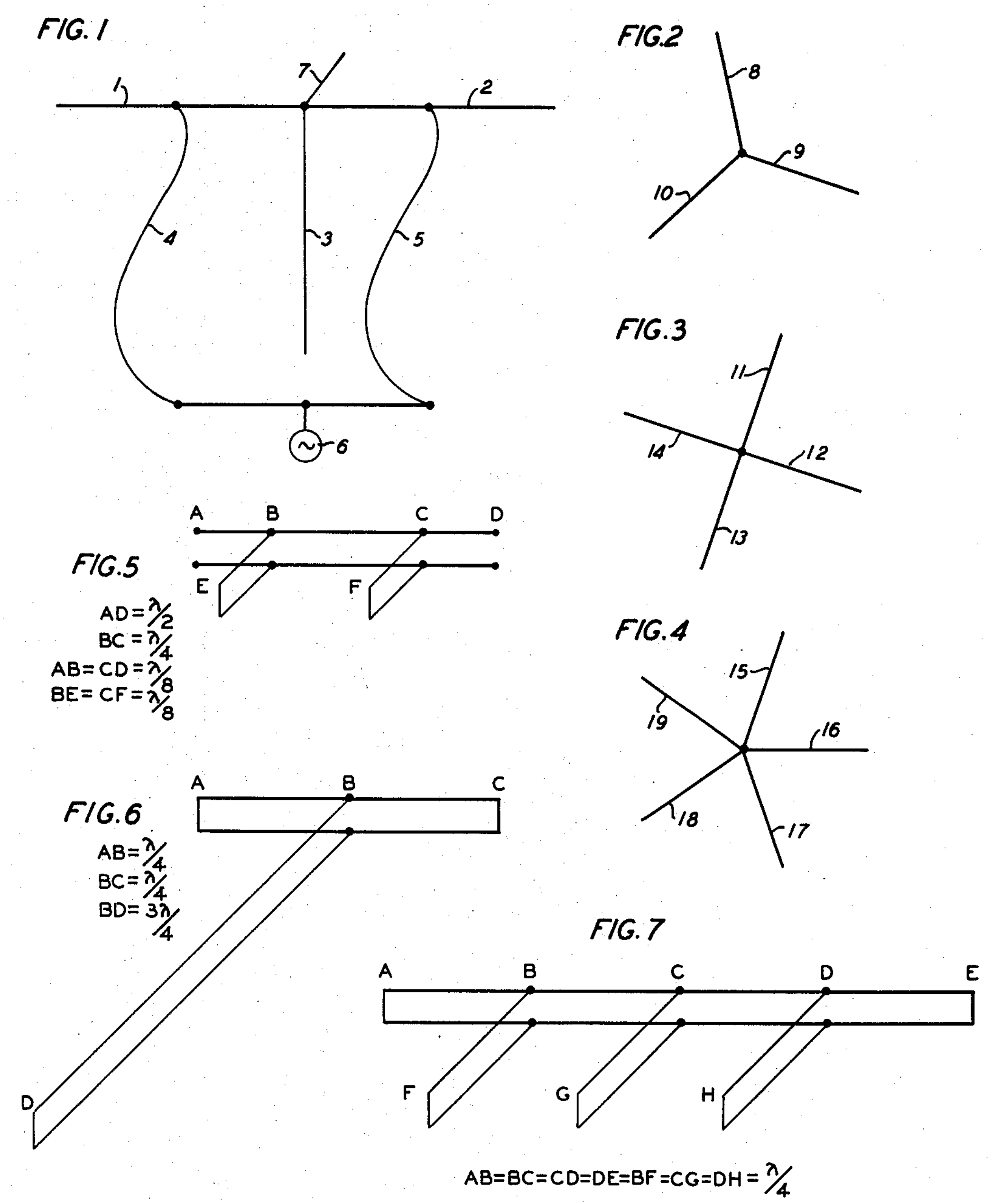
FIG. 1 is a schematic diagram showing the relative dimensions and arrangements of a set of three transmission line stubs used in one form of the present invention and indicating the location of the input and output connections thereto.
FIG. 2 is a diagram showing how three stubs of transmission line may be arranged in the form of the letter Y to constitute the device of the present invention.
FIG. 3 is a similar diagram showing how four stubs of transmission line may be arranged to form a device embodying the features of the present invention.
FIG. 4 is a similar diagram showing how five stubs of transmission line may be arranged to form a device embodying the features of the present invention.
FIG. 5 is a schematic drawing showing how a single half wave length of transmission line having two decoupling stubs attached thereto at one quarter and three quarter length of an open ended line may be used.
FIG. 6 is a schematic drawing showing an arrangement similar to the basic design herein described but in which the decoupling stub instead of being one quarter wave length is three quarters wave length.
FIG. 7 is a schematic drawing showing an arrangement consisting of a transmission line of a full wave length divided into four quarter wave length sections and having a decoupling stub one quarter wave length at the one quarter, one half and three quarters points thereof.

In accordance with the present invention, an arrangement very generally shown by FIG. 1 is employed. This is essentially a section of transmission line consisting of two equal length stubs 1 and 2 and a third stub 3 connected to the others at the junction thereof. The section of transmission line 1 and 2 is equal in its physical dimensions to a full wave length of frequency $2f$, or one half wave length of frequency $f$, and may therefore be said to be tuned to the signal frequency $f$. Since all three stubs are of equal length, each is then one half wave length of frequency $2f$, or one-quarter wave length of frequency $f$. Connections 4 and 5 are made to the stubs 1 and 2 respectively from an oscillator 6 acting as a stimulus, proper arrangements being made to complete and to break this connection as desired and care being taken to insure that the transmission lines thereof are equal. The frequency from this source 6 is $2f$. An input-output connection 7 is provided by which the output of the device at frequency $f$ may be carried to any desired point, such as the input of another device of the same nature.

It has been stated hereinbefore that the device may consist of a plurality of stubs of transmission line having their open ends interconnected and that two of such line stubs constitute a half wave length at the frequency $f$ (the parametric oscillation) and that another connection to the junction of said two and of like dimensions constitutes a decoupling means to render both parts of the effective transmission line alike in phase. With respect to the line formed by arms 1 and 2, stub 3 acts as a short circuit for the stimulus frequency $2f$, thereby decoupling the arms 1 and 2 at the stimulus frequency, and as an open circuit for the signal frequency $f$ so that arms 1 and 2 form an uninterrupted half wave length section of transmission line at the signal frequency. Such a device may be as shown in FIG. 1, or it may be in the form of a Y, as in FIG. 2, in which case the arms 8 and 9 may constitute the half wave length transmission line to which the oscillator used as a stimulus is connected and the arm 10 may constitute the decoupling means. Again, the device may take the form shown in FIG. 3 where, let us say, the arms 12 and 14 constitute the half wave length transmission line, the arm 13 may constitute the decoupling means and the arm 11 may be used as an output channel. Again, the arrangement of FIG. 4 may be used where, by way of example, the arms 15 and 16 in combination with the pair 18 and 19 may constitute the half wave transmission line and the stub 17 may constitute the decoupling means. This means that like connections from the stimulus are made to both arms 15 and 16 so that these two are substantially in parallel and act as a single arm, and reversed connections from the stimulus are made to both arms 18 and 19 so that these two are substantially in parallel and likewise act as a single arm. Thus the pair of arms 15 and 16 will act as the arm 1 and the pair of arms 18 and 19 will act as the arm 2 of FIG. 1.

It may be noted that great regularity as shown in these FIGS. 2, 3 and 4 is not necessary but may be found convenient since the device in one form may be like a circuit printed upon a thin wafer of ferroelectric material and it may take more or fewer stubs so formed to produce the desired or necessary circuit constants.

FIGS. 5, 6 and 7 schematically show other forms in which the device may be constructed. FIG. 5 shows how an open end transmission line may be constructed by using two decoupling stubs and placing them in such positions that the ends A and D are at nodal points where the line must be open. In FIGS. 5, 6 and 7 the stimulus connections are not shown, but may, as is illustrated in FIG. 1, be connected to the midpoints of the quarter wave length sections of the line which may be termed decoupled sections. However, it should be noted that the stimulus connection is not necessarily made at the midpoint of each decoupled section, but rather, the stimulus connection is made at a point in each section determined by matching considerations, i.e., by the relative impedance of the stimulus generator and the characteristic impedance of the transmission line. In FIG. 5 stimulus connections would be made at A and D and halfway between B and C. The input-output connections would be made at any junction of the line and a stub, as at B, by way of example.

FIG. 6 differs from the basic design indicated in FIG. 1 by having its decoupling stub lengthened to three quarters wave length. No change in operation is produced by changing the length of this stub to an odd multiple of its basic one quarter wave length because at the end of such one quarter wave length a nodal point fully equivalent to an end short circuit is formed. However the longer length stub may have other advantages which may be used in a practical form of the invention but which are of no concern presently.

FIG. 7 shows a plan for a full wave length transmission line design with quarter wave length stubs connected thereto at each quarter wave length measure.

FIG. 8 shows one manner in which the device of the present invention may be constructed and arranged. The base 22 represents a thin slab of ferroelectric material, such, by way of example, as tri-glycine sulphate or barium titanate. This may be drilled and a conductor threaded therethrough to form a plurality of stubs, shortcircuited at their far ends but all connected together at a junction point 23. Alternatively, rivets may be used at the ends 24, 25 and 26 and the conductors may be wires, foil, or conducting material, painted, sputtered, or otherwise deposited on the crystal 22. Since this device operates in or near the range of superhigh frequencies (a conventional designation meaning 3,000 to 30,000 mc.), the terminal connections at the ends of the stubs between the conductors on the opposite faces of the crystal may be provided by enlarged areas to provide virtual condensers at the stub ends between the upper face and lower face conductors, as indicated in FIGS. 9 and 10. It is to be noted that the invention is not limited to superhigh frequencies but will operate equally well at other frequencies. However, from a practical standpoint the superhigh frequencies are favored because of the dimensions available thereat.

FIG. 10 is a schematic representation of how a plurality of devices 30, 31 and 32 may be mounted or formed on a single crystal base and how the crystal may be biased by a connection between a bias battery 33 connected to the top and bottom faces thereof which are coated with some conducting material such as graphite which will have a resistance characteristic value such that the direct current potential will be effective but will not substantially interconnect the various devices at the high frequencies at which they are worked.

The basic timing consideration in a device of the present nature is that the capacitance of the device must be variable in such a manner that, as the capacitance caused by the stimulus variation is decreasing, the charge due to the signal must be small, and, as the capacitance is increasing, the charge must be large. The nonlinear capacitance element used may have a characteristic relation between charge (Q) and voltage (V) such as is pictured in FIG. 12 which is similar to the characteristic of a p-n junction, from which it would appear that a long p-n junction would provide material having the desired characteristics out of which to construct the device of the present invention. Following the curve of FIG. 12, it may be noted that as the voltage applied to the device changes from its extreme positive value, point 20, to its extreme negative value, point 21, the charge Q changes at an increasing rate and that as the movement in the opposite direction takes place, the charge changes at a decreasing rate. Thus, the stimulus, at frequency $2f$, provides what has been termed a pumping means, whereby a small input signal will be periodically fortified in such manner that the effect caused thereby will tend to increase exponentially.

FIG. 13 shows a ferroelectric characteristic just a little above the transition temperature or Curie point where by biasing to the point 22 a marked nonlinear stage is reached. This is somewhat similar to the working of ferromagnetic devices where biasing to the knee of the hysteresis curve is practiced. However, the existence of hysteresis loop losses limits the operation of ferrite parametric devices, as described by Goto, to low frequencies and precludes the operation of such devices in the superhigh frequency range. Thus a strikingly nonlinear point, just above the Curie point, of the ferroelectric material may be reached by temperature control, such as by housing the material in an oven where it may be kept at a constantly elevated temperature.

Regarding the operation of the device of the present invention it is to be noted that a transmission line a half of a signal wave length in extent, as shown in FIG. 14, has a connection from a source of stimulus made to each half thereof and these two halves have a decoupling stub connected to their junction. When the stimulus at frequency $2f$ is applied thereto a minute signal in this half wave length line is quickly developed into a strong signal at frequency $f$, by the process known as parametric oscillation.

Looking at FIG. 14, it will be noted that in the absence of the stub 3, the effect of the stimulus from the oscillator 6 will be to energize the section of transmission line 1 and 2 in such a manner that the changing values of the potential applied simultaneously to all parts thereof may be expressed by a sinusoid. However, the connection of the stub 3 to the junction of stubs 1 and 2 will act to decouple the combination of stubs 1 and 2 and therefore to permit changing of the phase of 2 with respect to 1 by properly phasing the two stimulus signals arriving at 1 and 2, through 4 and 5 respectively, so that the effect may be shown by FIG. 14, the two halves of this line now acting in concert and resulting in the production of a wave double the wave length in space, though the timing has not changed. FIG. 14 is intended to indicate that by decoupling the two quarter wave length sections of transmission line both parts may be made to respond in the same manner. Nothing affects the sinusoidal variation of the stimulus in time but the effect all along the line is adjusted so that all points are acting in phase.

It should be further noted with respect to FIG. 14, that the effect produced upon the application of the stimulus is at first small but that due to the variable capacitance of the ferroelectric material, the effect grows and produces a definite and unchanging oscillating signal. In order to satisfy this consideration, two conditions must be met. First the magnitude of the charge of the signal built up in the line must be large at the same time all along the line and small at the same time all along the line, that is, the magnitude of the charge must be changing, increasing or decreasing, in the same direction all along the line. Secondly, the stimulus must be effective to produce changes in capacitance which are in phase all along the line. The first condition is met in the structures herein disclosed, since stub or stubs decouple the sections of the line to which the stimulus is separately applied, thereby allowing the response in each section to be in phase with the response in the other sections of the line. Thus, it can be seen that the structures herein disclosed as illustrating applicant's invention are in the form of transmission lines which are resonant simultaneously at frequencies $f$ and $2f$ and exhibit a standing wave response at both frequencies. The whole transmission line structure, or at least a part of it, is modified by the provision of stubs connected to the line so that the response of the frequency $2f$ will be in phase time wise all along the line. These stubs, at the point at which they are connected, appear as an open circuit to the frequency $f$ and as a short circuit to the frequency $2f$. The stubs are attached at the nodes of the standing wave pattern associated with the frequency $2f$. The stubs do not effect the response of the frequency $f$ but act as decouplers at the frequency $2f$. The decoupled portions of the line can be excited separately with the stimulus frequency $2f$ so that the stimulus is in phase in all of the decoupled sections. The signal having a frequency $f$, which is built up in the transmission line in response to the stimulus at frequency $2f$, may have one or the other of two different phase relationships to the stimulus, and the phase relationship may be controlled by applying properly timed priming signals to the input of the device. The device, therefore, has utility in computer applications, for example, in memory and/or logical circuits, as is fully explained in the above cited Von Neumann patent.

What is claimed is:

1. A length of transmission line having its ends effectively shortcircuited and constituting two open end quarter wave length sections of transmission line for a frequency $f$, having their said open ends connected each to the other, another open end quarter wave length transmission line section having its open end connected to the said junction of said first two sections, a dielectric material in cooperative relationship with said line sections having non-linear characteristics, a source of alternating current potential of a frequency $2f$ for connection to said first two line sections and an input-output connection from said junction of said line sections.

2. A device for responding to a stimulus having a frequency $2f$ to produce an exponentially increasing response having a frequency $f$, consisting of a plurality of frequency $f$ quarter wave length sections of transmission line each having one effectively closed end and one open end in which all said open ends are multipled together, stimulus input connections to said device made to the conductors of two of said transmission line sections and output connections made to the junction of said sections, said transmission line sections being characterized by means associated therewith to fortify the response of said device to increasing input potential applied to said input connections and to relax the response of said device to decreasing input potential applied to said input connections.

3. A frequency changing device consisting of a section of transmission line having a length equal to one half the wave length of an alternating current signal to be developed therein, an oscillator constituting a source of stimulus supply of a frequency twice that of said developed signal, and means connected to said transmission line section for decoupling one portion thereof from another to permit connection of said stimulus separately to said two portions of said transmission line.

4. A device consisting of a plurality of frequency $f$ quarter wave length sections of transmission line each having one open circuit end and one closed circuit end in which all said open circuit ends are connected in multiple, an oscillator having a frequency $2f$ for applying a stimulus to certain of said sections of transmission lines, the remaining ones of said sections operating as means to permit connection of said oscillator separately to said certain sections of said transmission line and output conductors connected to said multiple point.

5. A device for deriving an effect at frequency $f$ from a stimulus at frequency $2f$ including a plurality of branches of transmission line radiating from a common point at which all said branches are connected in multiple, each said section of transmission line consisting of lines of conducting material laid upon the upper and lower surfaces of a thin slab of ferroelectric material, said lines of each said branch being connected together at their free ends and means for controlling the temperature environment of said device to adjust the properties of said ferroelectric material to its most pronounced nonlinear region.

6. A device for deriving an effect at frequency $f$ from a stimulus at frequency $2f$ including a plurality of branches of transmission line radiating from a common point at which all said branches are connected in multiple, each said section of transmission line consisting of lines of conducting material laid upon the upper and lower surfaces of thin slab of ferroelectric material, said lines of each said branch being effectively connected together at their free ends and means for biasing the said ferroelectric material to bring the working thereof into a nonlinear region consisting of a thin coating of a moderately resistive conducting material applied over both the said ferroelectric material and the conducting lines laid thereon and direct current battery means for applying a difference in potential to the said opposed faces of said device.

7. A device for responding to a stimulus having a frequency $2f$ to produce an increasing response having a frequency $f$, consisting of a series of frequency $f$ quarter wave length sections of transmission line, each comprising a pair of conductors sepated by nonlinear dielectric, a closed end stub of frequency $f$ quarter wave length transmission line connected to the joined ends of said sections of said series, a source of stimulus of frequency $2f$ connected to the conductors of each said section and input-output conductors connected to one said junction of a said decoupling stub and two said sections of transmission line.

8. A device for responding to a stimulus having a frequency $2f$ to produce an increasing response having a frequency $f$, consisting of a series of sections of transmission line, totaling in length an integral number of frequency $f$ quarter wave lengths, each said section comprising a pair of conductors in cooperative relationship with a dielectric having nonlinear properties, a closed end stub of frequency $f$ quarter wave length transmission line connected to the joined ends of said sections of transmission line to decouple the said sections of said series, a source of stimulus of frequency $2f$ connected to the conductors of each said section and input-output conductors connected to one said junction of a said decoupling stub and two said sections of transmission line.

9. A parametric circuit device comprising, a transmission line having a controllable nonlinear reactance, the length of said line being substantially equal to one half wave length at a frequency $f$, a stub connected to the midpoint of said line having a length substantially equal to one-quarter wave length at said frequency $f$, said stub appearing as an open circuit to signals on said line at said frequency $f$ and appearing as a short circuit to signals on said line at a frequency $2f$.

10. The device of claim 9, wherein means are provided for separately applying a stimulus at a frequency $2f$ to two points on said line separated by said stub, whereby the response of the nonlinear reactance of said line to said stimulus is in phase all along said line.

11. The device of claim 9, wherein said transmission line comprises a body of ferroelectric material having electrodes on opposite faces thereof.

12. A parametric circuit device comprising, a transmission line having a controllable nonlinear reactance, the length of said line being substantially equal to one half wave length at a frequency $f$, a stub connected to the midpoint of said line having a length such that it appears as an open circuit to signals having a frequency $f$ on said line and as a shortcircuit to signals having a frequency $$\frac{2}{n}f$$

on said line, where n is an integer.

References Cited in the file of this patent

UNITED STATES PATENTS

| | | |
|---|---|---|
| 2,815,488 | Neumann | Dec. 3, 1957 |
| 2,948,818 | Goto | Aug. 9, 1960 |
| 2,977,482 | Sterzer | Mar. 28, 1961 |

OTHER REFERENCES

Textbook: Essentials of Microwaves, Muchmore, Robert B., Wiley & Sons, N.Y., 1952, pp. 1–69.

Publication, Physical Review, vol. 106, No. 2, April 15, 1957, pp. 384, 385.

Publication, Journal of Applied Physics, vol. 29, No. 3, March 1958, p. 594.

Publication, Proceedings of the IRE, April 1958, pp. 700–706.

Publication, IBM Technical Disclosure Bulletin, vol. 2, No. 2, August 1959.